United States Patent [19]

Lyzohub

[11] Patent Number: 4,625,980
[45] Date of Patent: Dec. 2, 1986

[54] FUEL TANK

[75] Inventor: Walter A. Lyzohub, Redford Township, Wayne County, Mich.

[73] Assignee: Chrysler Motors, Highland Park, Mich.

[21] Appl. No.: 749,974

[22] Filed: Jul. 1, 1985

[51] Int. Cl.$^4$ .............................................. B62K 15/02
[52] U.S. Cl. .................................... 280/5 A; 220/5 A; 220/67; 220/81 R
[58] Field of Search .............. 280/5 A, 5 R; 220/5 A, 220/8, 400, 402, 67, 77, 81 R, 465, 470

[56] References Cited

U.S. PATENT DOCUMENTS

| | | | |
|---|---|---|---|
| 2,846,231 | 8/1958 | Fritz | 280/5 A |
| 3,158,282 | 11/1964 | Housz | 220/465 |
| 4,346,743 | 8/1982 | Miller | 220/470 |

Primary Examiner—John J. Love
Assistant Examiner—Donn McGiehan
Attorney, Agent, or Firm—Kenneth H. MacLean, Jr.

[57] ABSTRACT

A composite vehicle fuel tank including a one piece inner enclosure of elastomeric material, a rigid outer walled structure including a generally cup shaped and open topped metal enclosure and covered by a separate metal top having a peripheral edge depending in overlying relation to an upper side edge portion of the open topped metal enclosure. An integral portion of the elastomeric liner tightly fits between the top's depending edge and upper edge portion of the side walls.

1 Claim, 2 Drawing Figures

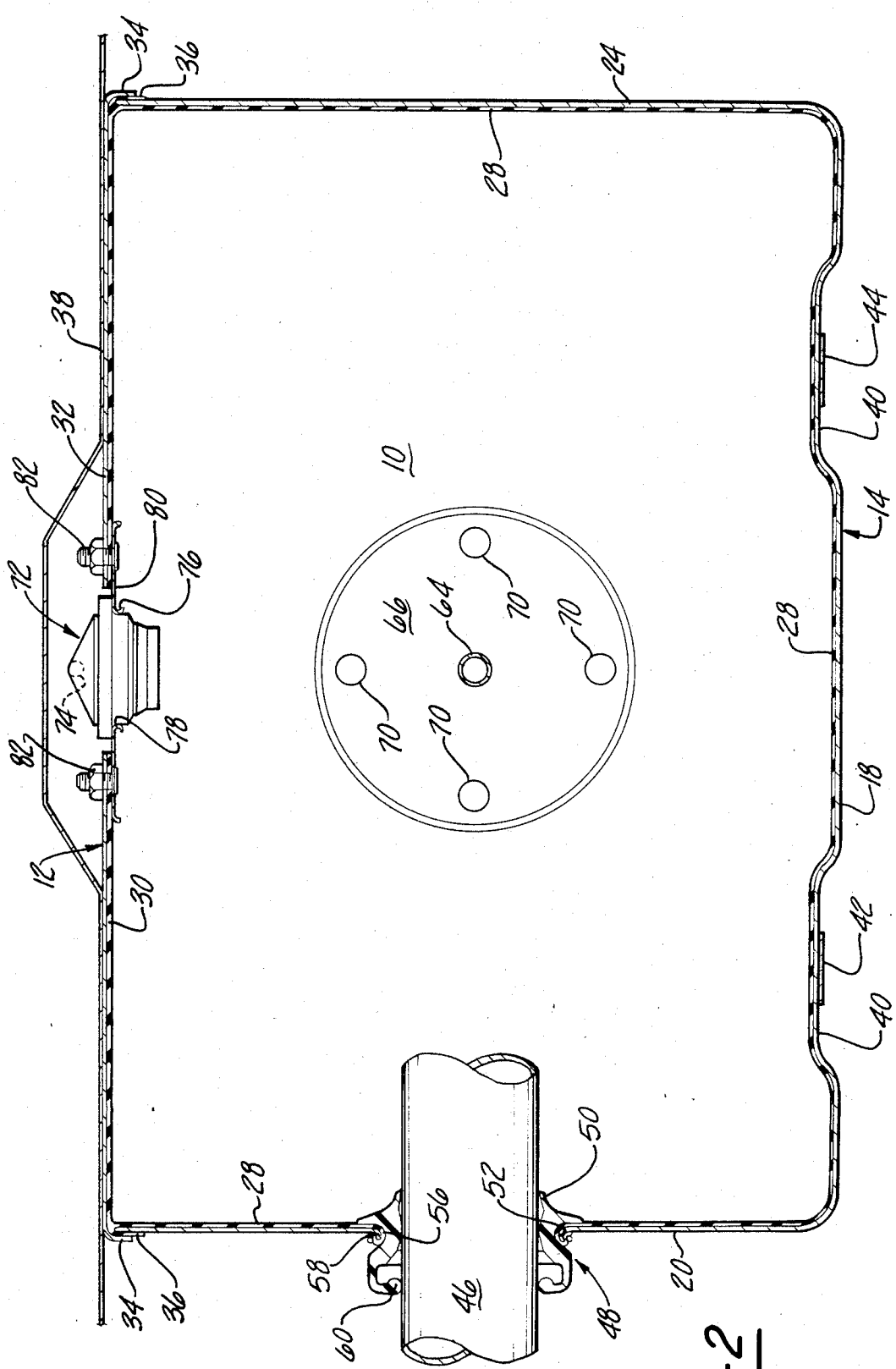

FUEL TANK

BACKGROUND OF THE INVENTION

There have been other designs of composite or multi-layer fuel tanks. One other example is disclosed in U.S. Pat. No. 3,968,896 to Giacoletti et al. The Giacoletti patent has an inner enclosure of elastomeric material surrounded by a conventionally "clam-shell" assembled metal shell. Outwardly projecting edge portions mate together near the tank's mid-portion in clam-shell fashion and are secured together by conventional but undisclosed means.

The subject composite fuel tank includes an elastomeric inner enclosure. In a preferred generally six-walled configuration, the inner enclosure is reinforced and supported by a generally "cup-shaped" and open topped metal outer housing and a metal top member. The top member has a peripheral edge which depends therefrom and overlies the upper edge portion of the other member's side walls. An integral strip projecting outward from the exterior of the elastomeric enclosure extends between the two edge portions of the outer housing and is compressed therebetween for a good sealing fit.

The aforedescribed fuel tank structure presents a particularly easy to assemble composite fuel tank. In addition, when its top member is secured to a generally flat and horizontally extending vehicle structure by strap fastening extending about the outer housing thereto, the composite fuel tank is made particularly secure and rigid. An advantage of providing a strip portion of the elastomeric enclosure between overlying edges of the top and sides of the rigid outer enclosure is that this tends to provide a good seal and maintains the two layer top wall and the side wall structures in close side-by-side relation to one another.

Accordingly, an advantage of the subject invention is the provision of a two-layered enclosure with a flexible inner layer secured to a more rigid outer layer by means of an integral strip of the inner layer which is pressed between overlying edge portions of the outer layer.

Another advantage of the subject invention is the provision of a two layered composite fuel tank including a flexible elastomeric inner enclosure which is enclosed within a more rigid outer enclosure consisting of a bottom and side walled member and a mating top walled member with an integral portion of the inner elastomeric enclosure secured between overlying portions of the two outer members.

Other advantageous features of this invention will be even more readily apparent from a reading of the following detailed description of a preferred embodiment, reference being had to the drawings of the preferred embodiment as follows:

FIG. 1 is a side elevational view of the subject fuel tank partially broken away to reveal details of the fuel inlet means and the fuel outlet means; and FIG. 2 is a sectioned view of the subject fuel tank taken along section line 2—2 in FIG. 1 and looking in the direction of the arrows.

DETAILED DESCRIPTION OF THE PREFERRED EMBODIMENT

Figure 1:
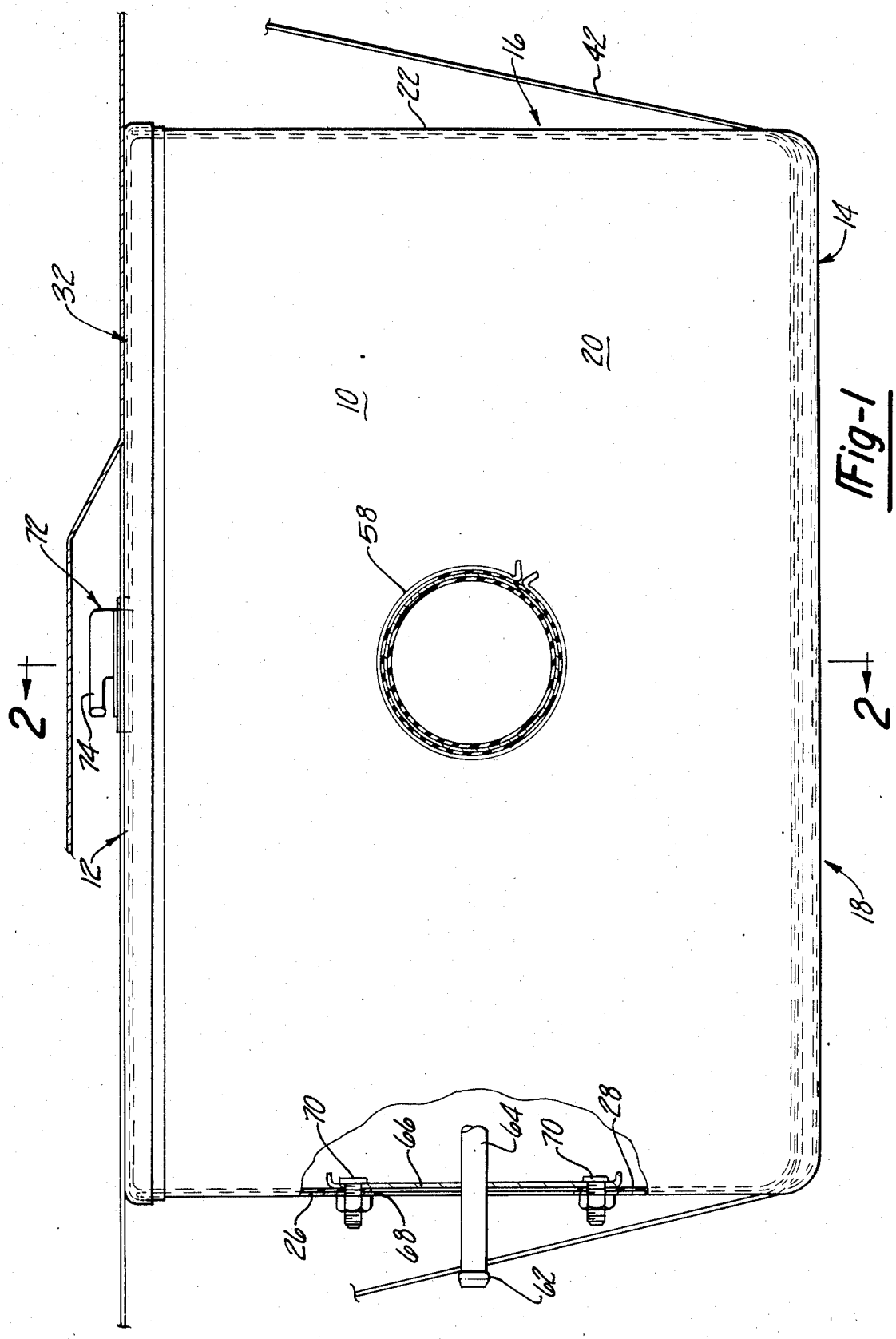

In FIGS. 1 and 2, a lightweight, but relatively rigid vehicle fuel tank 10 is illustrated. The tank 10 is generally rectangular in shape and has a top wall 12, a bottom wall 14 and side walls 16. The bottom and side walls are formed in two layers as shown best in FIG. 2. An outer metal layer or enclosure has a generally cup-shaped or open ended configuration with the bottom portion 18 and four side wall portions 20, 22, 24, 26 being integrally formed of metal drawn into the desired cup-shaped configuration. The inner enclosure or layers 28 as well as the inner top wall portion 30 are integrally formed of synthetic elastomeric material which is resistant to attack by fuel or the like. The integral inner enclosure 28, 30 forms a leak resistant fuel storage structure.

An outer top layer 32 is of generally flat sheet metal and overlies the inner portion 30. A peripheral edge portion 34 of top layer 32 is formed normally to the planar extent of the remainder of the top to encircle the upper edge portions of the side walls 20, 22, 24 and 26.

The integral bottom, top and side inner layers 28 and 30 of elastomeric material are configured to lie on the inside of the outer portion 18, 20, 22, 24 and 26 and include an integral strip or overlying portion 36 extending outwardly over and past the upper edge of side walls 20, 22, 24 and 26 and then downward over the top edge surface thereof. The peripheral edge portion 34 of the top 32 overlies both strip portion 36 and the upper edge portion of said walls 20, 22, 24 and 26. Also, this upper edge of side walls 20, 22, 24 and 26 with strip portion 36 thereon is press-fit snugly into the encirclement defined by the peripheral edge 34 of top 32.

The outer top member 32 is seated against a horizontally and generally planar vehicle body member 38. This greatly rigidifies the top structure including the outer metal member 32. The bottom structure of the tank, specifically portion 18 has inwardly formed channels 40 therein along which security or support straps 42, 44 extend. The upper end portions (not shown) of straps 42, 44 are secured to the body member 38 of the vehicle or other appropriate mounting member.

The tank 10 has an aperture means through the side wall structure for fuel input and includes a filler tube 46 with an elastomeric seal member 48 therearound. The outer or leftward end (not shown) of the filler tube 46 which is located away from the tank 10 has an inlet opening for receiving fuel and is normally covered by a filler cap. The end within the tank 10 is open to deposit fuel therein. The seal member 48 includes as inwardly directed edge forming a lip 50 tightly encircling the filler tube 46 to prevent fuel leakage therebetween. Adjacent the lip 50 is a main body portion with a channeled surface 52 fitting into an aperture framed by an outwardly projecting rim 56 of the outer side wall 18. The rim 56 is covered by a continuous portion of the inner wall 28 which extends out through the aperture means and is folded back over the rim 56. A constrictive ring-like fastener 58 maintains the folded back portion of inner wall 28 around rim 56. Also, the exterior end of the seal member 48 includes an inwardly directed lip 60 which contacts filler tube 46.

The tank 10 includes a fuel outlet means through the side wall 26 as best shown in FIG. 1. An outlet nipple 62 and integral feed tube 64 are attached to a plate 66 which is mounted over an opening 68 in side wall 26. Outlet nipple 62 is adapted to be connected to a fuel line (not shown) extending to the vehicle engine compartment. A plurality of fasteners 70 secure the plate 66 to the inner wall 28 and outer side wall 26.

A combination roll-over and vapor vent device 72 is mounted in the top wall 30, 32 of the tank 10. Specifically, device 72 has a generally hollow body with an outlet tube or nipple 74 located atop for connection to a vapor storage device as commonly used in motor vehicles. The device 72 has a circumferentially extending channel 76 therein encircled by a rounded edge portion 78 of a mounting plate 80. The plate 80 is attached to inner wall 30 and outer wall 32 by a plurality of fasteners 82. Within the hollow interior, the roll-over portion of the device includes a conventional ball activated valve as in current automotive roll-over devices.

Although only one embodiment of the subject composite fuel tank has been illustrated and described in detail, it should be understood that modifications may be made which will still fall under the scope of the following claim language which describes the invention.

I claim:

1. In a vehicle:

a substantially horizontally disposed and generally flat structural member such as a trunk floor;

a composite type fuel tank with a two-layer structure including an inner enclosure means of elastomeric material having bottom, top and side walls and an outer enclosure means of rigid material including a member defining integral bottom and side walls and another member defining a top wall, the top wall extending in parallelism and touching engagement with the structural member;

the side walls of the outer enclosure means defining an upper edge portion extending in closely spaced relation to the top wall;

an integral strip of the elastomeric enclosure means extending between the upper edge and the top wall and then folded over in overlying relation to the exterior of the side walls adjacent the upper edge thereof;

a peripheral edge portion on the top wall of the outer enclosure means extending normally to its generally planar extent and over the integral elastomeric strip thereby pressing the strip tightly against the upper edge portion;

at least one opening means through the walls, the opening means being formed by an outwardly turned edge of the outer enclosure wall, a portion of the flexible elastomeric inner enclosure being extended over the turned edge and folded back over the exterior surface of the outer enclosure wall;

strap means connected at opposite ends to the vehicle structural member and with the midpoint engaging the bottom wall structure of the fuel tank thereby securing the fuel tank to the vehicle and pressing the upper edge portion of the side walls against the top portion in good sealing relation whereby the top wall is held securely against the structural member to produce a tank resistant to outward movement of the top due to internal tank pressure greater than the atmospheric pressure.

* * * * *